United States Patent [19]

Vaught

[11] Patent Number: 4,494,128

[45] Date of Patent: Jan. 15, 1985

[54] GRAY SCALE PRINTING WITH INK JETS

[75] Inventor: John L. Vaught, Palo Alto, Calif.

[73] Assignee: Hewlett-Packard Company, Palo Alto, Calif.

[21] Appl. No.: 419,299

[22] Filed: Sep. 17, 1982

[51] Int. Cl.³ .......... G01D 15/16

[52] U.S. Cl. .......... 346/140 R; 137/807; 137/828

[58] Field of Search .......... 346/140 PD, 140 IS; 137/807, 828

[56] References Cited

U.S. PATENT DOCUMENTS

| | | | |
|---|---|---|---|
| 3,852,773 | 12/1974 | Sicking | 346/140 PD |
| 4,068,144 | 1/1978 | Toye | 346/75 |
| 4,109,282 | 8/1978 | Robertson | 346/140 R |
| 4,251,824 | 2/1981 | Hara | 346/140 PD |
| 4,313,684 | 2/1982 | Tazaki | 346/140 PD |
| 4,326,205 | 4/1982 | Fischbeck | 346/140 PD |
| 4,376,945 | 3/1983 | Hara | 346/140 PD |

*Primary Examiner*—E. A. Goldberg
*Assistant Examiner*—Mark Reinhart
*Attorney, Agent, or Firm*—Jeffery B. Fromm

[57] ABSTRACT

An ink jet system using a single transducer chamber is disclosed which can produce a wide variation in visual print density (gray scale) without a reduction in print resolution. Vehicle is mixed with the ink during the actual jet printing process to produce the desired gray scale. The system is also readily adapted to produce multi-color prints.

7 Claims, 2 Drawing Figures

GRAY SCALE PRINTING WITH INK JETS

BACKGROUND

A useful printing density range for a visually acceptable gray scale requires approximately ten steps of density change between "white" and "dark". In an ink jet printer, where droplets of ink are expelled from a transducer chamber through discharge orifice by some form of mechanical force such as a vapor bubble produced by a discharge resistor, various methods have been tried to produce such a desired gray scale range.

A first method which depends on controlling the volume of the droplets of expelled ink over a 10 to 1 range has unfortunately proven extremely difficult.

A second method requires adding or deleting drops of ink from individual picture elements (pixels) that create the picture cells. This will produce the desired gray scale effect, but at a substantial reduction in resolution since with any given drop size and discharge orifice spacing, the resolution is reduced by the square root of the number of gray scale steps within each picture cell.

SUMMARY OF THE INVENTION

Rather than alter the droplet size or reduce the printing resolution, the present invention produces a wide gray scale range by diluting the ink with an appropriate vehicle to obtain the desired gray scale density prior to droplet discharge. The vehicle used may be any of a wide range of liquids such as the solvent employed to dissolve the dye in the undiluted ink.

The valving of the vehicle, ink, or both can be done with either analog or on/off valves placed in the fluid feed lines between the respective liquid reservoirs and the transducer chamber. The fluid feed lines themselves can be capillaries. One novel on/off valving method is also disclosed which uses a valve resistor to create a stationary vapor bubble blown in the refill capillaries to impede flow to the transducer chamber. Such a valve resistor is compatible with the thermal ink jet process which uses a heating resistor to create vapor bubbles for expelling the droplets.

This same valving system can also be used to produce multi-colored prints. Rather than diluting a dark ink with a light or colorless vehicle, variously colored inks can be valved into the transducer chamber. In addition, the gray scale and multi-colored systems can be combined by valving both colored inks and a vehicle so as to produce prints with varying visual density as well as multiple colors.

DETAILED DESCRIPTION OF THE DRAWINGS

DETAILED DESCRIPTION OF THE INVENTION

Figure 1:
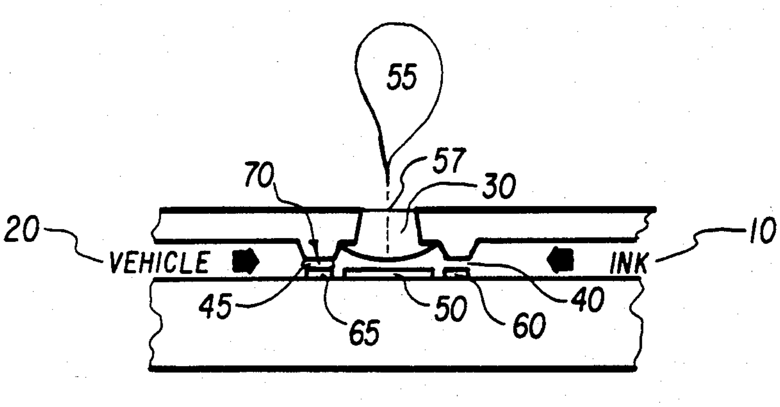
FIG. 1 shows a first embodiment of the present invention for use as a gray scale or multi-color jet printer.

The first embodiment of the present invention is illustrated in FIG. 1 for a gray scale jet printing system. The undiluted ink is stored in an ink reservoir 10 and an appropriate diluting vehicle is stored in a vehicle reservoir 20. Each reservoir 10 and 20 is connected to a transducer chamber 30 by an ink capillary 40 and vehicle capillary 45 respectively. Within the transducer chamber 30 is a drop discharge means 50 such as a discharge resistor used in a thermal jet system which discharge 50 creates the force required to expel a droplet 55 through a discharge orifice 57. Coupled to each capillary 40 and 45 is an ink valve 60 and a vehicle valve 65 for regulating the flow of ink or vehicle respectively. As shown in FIG. 1, the valves 60 and 65 are valve resistors which when turned on by applying electrical current will create a stationary vapor bubble 70 in the capillaries 40 and 45 thus stopping the flow of fluid between the reservoirs 10 and 20 and the transducer chamber 30. For best density control vapor bubble 70 should have a volume not larger than the volume of droplet 55 divided by two times the number of density steps desired.

The valves 60 and 65 can be turned on or off independently for any desired length of time. Thus, if the vehicle valve 65 is turned on while the ink valve 60 is turned off only ink will be transported to the transducer chamber 30 to be expelled through the discharge orifice 57 as the next droplet 55. If the ink valve 60 and vehicle valve 65 are each turned on for one-half of the refill time before the next droplet 55 is fired the resulting next droplet 55 will be proportionately diluted and reduced in visual density. By appropriately timing the ratios of on/off times of valves 60 and 65 a full gray scale range of printing is produced. Similarly, variable analog valves with continuously variable flow resistance can also be substituted for the binary on/off valves 60 and 65 to vary the dilution ratio of ink and vehicle in the transducer chamber 30 for the next droplet 55.

The system illustrated in FIG. 1 can also be used to produce multi-color prints. Rather than using an ink and a dilution vehicle, two or more different colored inks are mixed in transducer chamber 30. Each different color ink must be stored in a separate reservoir and controlled by a separate valve. As described above, either analog or binary on/off valves may be utilized. The number of reservoirs and corresponding valves is determined by the number of colors desired and the mixing characteristics of the inks used. An additional vehicle reservoir and valve may also be incorporated into the multi-color printer to vary the visual density of the colors as well as the color itself.

Figure 2:
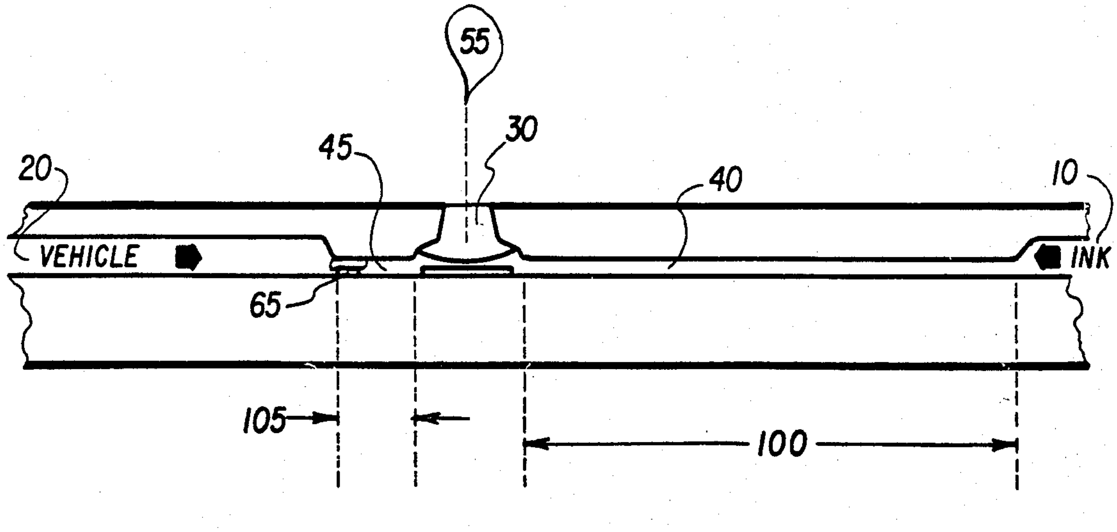
FIG. 2 shows a second embodiment of the present invention for use as a gray scale jet printer which requires only a single flow valve.

The second embodiment of the present invention is illustrated in FIG. 2. The operation of the second embodiment is very similar to the operation of the first embodiment, however the second embodiment is specially adapted for the production of gray scale prints. In this embodiment there are only two reservoirs: an ink reservoir 10 and a vehicle reservoir 20, each with a corresponding capillary 40 and 45. However in the second embodiment there is an ink flow restrictor 100 and a vehicle flow restrictor 105 in series with the ink capillary 40 and vehicle capillary 45 respectively, and only a single valve 65 in series with the vehicle capillary 45. There is no valve in series with the ink capillary 40 in the second embodiment. For production of the desired gray scale the restrictors 100 and 105 should be of different magnitude.

In FIG. 2 the desired difference in restriction between the ink restrictor 100 and the vehicle restrictor 105 is realized by making the ink capillary 40 and vehicle capillary 45 different in length with the same cross sectional area. In a system where both the ink and the vehicle have the same viscosity, the desired ten steps of density change to produce a good gray scale range can, for example, be accomplished by making the restriction of the ink restrictor 100 ten times the restriction of the vehicle restrictor 105. Then, when the vehicle valve 65 is turned on for the total time to refill the transducer chamber 30, the next droplet 55 will be essentially all ink. If the vehicle valve 65 is turned off during the entire refill time, the mix would be 10 parts of vehicle to one part ink. By varying the on time of the vehicle valve 65, the ink dilution may thus be varied between no dilution and a maximum dilution limit set by the ratio of the magnitudes of the restrictors 100 and 105.

I claim:

1. A binary fluid flow valve comprising:

a capillary; and a heat source coupled to the capillary for boiling fluid in the capillary, to create a stationary vapor bubble which stops the fluid from flowing in the capillary.

2. A binary fluid flow valve as in claim 1 wherein the heat source is a resistor.

3. A binary fluid flow valve as in claim 1 further comprising on/off means coupled to the heat source for turning the heat source on and off.

4. In an ink jet system for printing having discharge means for expelling fluids from a transducer chamber, an apparatus for altering the visual appearance of the printing, the apparatus comprising:

a plurality of reservoirs each containing a different fluid to be printed;

capillaries connecting each of the reservoirs to the transducer chamber for carrying each of said fluids; and binary flow valves couples to each of said capillaries whereby flow through the capillaries may be turned on or off, said binary flow valves each having a heat source for boiling the fluid in the capillaries, thereby creating a vapor bubble which will stop fluid from flowing in the capillaries.

5. An apparatus as in claim 4 wherein each heat source comprises a resistor.

6. In an ink jet system for printing having discharge means for expelling fluids from a transducer chamber, an apparatus for altering the visual appearance of the printing, the apparatus comprising:

two reservoirs each containing a different fluid to be printed;

first and second capillaries connecting each of the reservoirs to the transducer chamber for carrying each of said fluids;

first and second flow restrictions in series respectively with the first and second capillaries; and a binary flow valve in series with the first flow restriction whereby flow through the first capillary may be turned on or off, each of said binary flow valves having a heat source for boiling the fluid in the first capillary, thereby creating a bubble which will stop fluid from flowing in said first capillary.

7. An apparatus as in claim 6 wherein the heat source comprises a resistor.

* * * * *

UNITED STATES PATENT AND TRADEMARK OFFICE
CERTIFICATE OF CORRECTION

PATENT NO. : 4,494,128

DATED : January 15, 1985

INVENTOR(S) : John L. Vaught

It is certified that error appears in the above—identified patent and that said Letters Patent is hereby corrected as shown below:

Column 1, line 9, "chamber through discharge orifice" should read -- chamber through a discharge orifice --;

Column 2, line 3, "discharge 50 creates" should read -- discharge means 50 creates --.

Signed and Sealed this

*Fourteenth* Day of *May 1985*

[SEAL]

*Attest:*

DONALD J. QUIGG

*Attesting Officer* *Acting Commissioner of Patents and Trademarks*